US008553995B2

United States Patent
Le Barz et al.

(10) Patent No.: US 8,553,995 B2
(45) Date of Patent: Oct. 8, 2013

(54) METHOD AND DEVICE FOR EMBEDDING A BINARY SEQUENCE IN A COMPRESSED VIDEO STREAM

(75) Inventors: Cédric Le Barz, Limours en Hurepoix (FR); Marc Leny, Colombes (FR)

(73) Assignee: Thales, Neuilly sur Seine (FR)

( * ) Notice: Subject to any disclaimer, the term of this patent is extended or adjusted under 35 U.S.C. 154(b) by 300 days.

(21) Appl. No.: 13/132,710

(22) PCT Filed: Nov. 30, 2009

(86) PCT No.: PCT/EP2009/066069
§ 371 (c)(1),
(2), (4) Date: Jul. 6, 2011

(87) PCT Pub. No.: WO2010/063680
PCT Pub. Date: Jun. 10, 2010

(65) Prior Publication Data
US 2011/0305364 A1    Dec. 15, 2011

(30) Foreign Application Priority Data
Dec. 5, 2008   (FR) ...................................... 08 06837

(51) Int. Cl.
*G06K 9/00*   (2006.01)
(52) U.S. Cl.
USPC ......................................... 382/232; 382/100
(58) Field of Classification Search
USPC ................... 382/232–253, 100; 375/240–243
See application file for complete search history.

(56) References Cited

U.S. PATENT DOCUMENTS

| 2002/0141653 A1* | 10/2002 | Estevez et al. ................. 382/250 |
| 2002/0181583 A1* | 12/2002 | Corbera .................... 375/240.03 |
| 2004/0028127 A1* | 2/2004 | Subramaniyan ......... 375/240.01 |
| 2006/0062308 A1* | 3/2006 | Staelin et al. ............. 375/240.18 |
| 2006/0188013 A1 | 8/2006 | Coimbra et al. |

FOREIGN PATENT DOCUMENTS

| FR | 2896938 A1 | 8/2007 |
| WO | 2007/032760 A1 | 3/2007 |

OTHER PUBLICATIONS

Coatrieux G et al.: "Strict integrity control of biomedical images", Proceedings of the SPIE—Int. Soc. Opt. Engineering USA, vol. 4314, 2001, pp. 229-240, XP002544035 p. 230, last paragraph, p. 231, paragraph 2-paragraph 5.

Lin C-Y et al.: "A Robust Image Authentication Method Distinguishing JPEG Compression From Malicious Manipulation", IEEE Trans. on Circuits and Systems for Video Technology, IEEE, Piscataway, US, vol. 11, No. 2, Feb. 1, 2001, pp. 153-168, XP001039014 p. 155, left-hand column, paragraph 3—p. 157, right-hand column, paragraph 2; figure 2.

(Continued)

*Primary Examiner* — Brian Le
(74) *Attorney, Agent, or Firm* — Baker & Hostetler LLP

(57) ABSTRACT

In a method of embedding a binary sequence in a video sequence or a compressed video stream, said stream being able to be decomposed into several types of objects, the method is applied to at least one image contained in said video sequence The method includes analyzing the video sequence in the compressed domain so as to determine one or more zones of interest, generating a watermarking map containing the image blocks available for the watermarking, excluding from the watermarking map, for the current compressed image, the blocks that are not eligible according to a defined criterion, and applying a digital watermarking function to each available block.

10 Claims, 5 Drawing Sheets

(56) References Cited

OTHER PUBLICATIONS

Fridrich J: "Visual hash for oblivious watermarking" Proceedings of the SPIE—The International Society for Optical Engineering SPIE-Int. Soc. Opt. Eng USA, vol. 3971, 2000, pp. 286-294, XP002534637.

Federal Information Processing Standards Publication [FIPS Pub 180-3]: Information Technology Laboratory, National Institute of Standards and Technology, Gaithersburg, MD, Oct. 2008.

* cited by examiner

METHOD AND DEVICE FOR EMBEDDING A BINARY SEQUENCE IN A COMPRESSED VIDEO STREAM

CROSS-REFERENCE TO RELATED APPLICATIONS

This application is a National Stage of International patent application PCT/EP2009/066069, filed on Nov. 30, 2009, which claims priority to foreign French patent application No. FR 08 06837, filed on Dec. 5, 2008, the disclosures of which are incorporated herein by reference in their entirety.

FIELD OF THE INVENTION

The invention relates to a method and a device making it possible to embed one or more types of information represented by a binary sequence in a video stream already compressed before its transmission. It may be used, in particular, to verify the partial integrity of a video stream and the objective thereof is notably to certify that the zones of interest of an image of said video stream have not been modified during transmission. The invention applies, for example, in a context of digital transmission of videos for which it is sought to guarantee that the content and in particular certain zones of an image that are more critical in terms of importance to the end user have not been modified by a malicious intermediary. These zones may correspond, for example, to moving objects. Another case of application of the invention consists in embedding in the compressed video stream, a high level message provided by a step of analysis in the compressed domain of said compressed video stream. This type of application allows for example the end user to obtain information about the content of the video sequence without having to decompress the video stream beforehand.

The invention can, inter alia, be used in applications implementing the standard defined in common by the ISO MPEG and the video coding group of the ITU-T termed H.264 or MPEG-4 AVC (advanced video coding) which is a video standard providing more effective compression than the earlier video standards while exhibiting a reasonable complexity of implementation geared toward network applications.

Hereinafter in the document, the term "foreground" designates the moving object or objects in a video sequence, for example, a pedestrian, a vehicle, a molecule in medical imaging. On the contrary, the designation "background" is used with reference to the environment as well as to fixed objects. This comprises, for example, the ground, buildings, trees which are not perfectly stationary or else parked cars.

In the description, the expression "compressed video stream" and the expression "compressed video sequence" refer to the same subject, namely a stream of data output by a video compression module whose input is a video captured in real time by a camera or else a video prerecorded in a file. The expression "watermarking-based markers" refers, in the subsequent description, to information embedded within a video or image stream via a watermarking method.

BACKGROUND OF THE INVENTION

Video monitoring systems are ever more widespread. To transmit the video or other information, they use broadcasting systems composed of wire-based or wireless heterogeneous networks whose architecture may be complex. In this regard one of the problems which arises is the obtaining of information about the content of the video sequence transmitted without previously decompressing the compressed video stream received. The type of information envisaged may, for example, serve to guarantee the integrity of the content of video sequences during their broadcasting in a context where they may be intercepted and modified by a malicious third party. In particular, certain zones of a video sequence may be of more important interest to the user, for example the zones identifying moving objects, as opposed to zones of lesser interest, for example zones such as the ground or the sky for which a guarantee of integrity is less crucial. Another type of information useful to the user may pertain, for example, to the characteristics of the zones of interest of an image, in particular information about the size or the color of said zones.

The prior art comprises various schemes making it possible to embed an item of information within a video stream, in particular, the techniques of digital watermarking of multimedia streams such as the one described in the following reference "Combining low-frequency and spread spectrum watermarking", SPIE proceedings series, 1999, Jiri Fridrich. This method consists in watermarking an image in its entirety and is performed on uncompressed video streams, thereby exhibiting the drawback of being complex to implement on processors with limited resources.

Other techniques making it possible to embed an item of information by watermarking in an already compressed video stream exist but they do not make it possible to identify and to process just certain zones of greater importance within an image and not the entirety of the content of the image.

For example, French patent application FR2896938 describes a method for watermarking digital data using the coefficients of a discrete cosine transform (DCT) to embed a signature within a video. The whole of the video is considered here without previously performing an analysis making it possible to determine the most critical zones, from the user's point of view.

Other problems are not solved by the prior art, such as for example:
- the watermarking of an image without any modification of the zones of interest and without decompression of the video sequence,
- the generation of relevant information relating to said zones of interest and their embedding in the compressed video stream, again without decompression of the video sequence,
- the insertion of watermarking-based markers making it possible to verify solely the integrity of certain relevant zones within the video sequence and not the whole of the sequence as is the case more traditionally.

SUMMARY OF THE INVENTION

One of the objects of the present invention is to offer a method of embedding an item of information in the form of a binary sequence in a compressed video stream. This item of information relates to certain zones of interest of the video sequence and the object thereof is, for example, verification of the integrity of said zones or an alert about elements characteristic of said zones such as the size or the color. Another object of the invention is to allow the insertion of watermarking-based markers without modifying the zones of interest of the sequence. For this purpose, the subject of the invention is a method for embedding a binary sequence in a video sequence or a compressed video stream, said stream being able to be decomposed into several types of objects, the method being applied to at least one image contained in said video sequence, characterized in that it comprises at least the following steps:

a) analyzing the video sequence in the compressed domain so as to define for a given compressed image at least one first type of objects or group of objects to be processed defining a zone of interest, b) generating a watermarking map defining the set of the blocks of pixels of the binary sequence that are eligible for the embedding operation, as well as two coefficients $C_1$ and $C_2$ arising from a frequency transform for each of said blocks, said coefficients $C_1$ and $C_2$ being drawn randomly from among the set of coefficients obtained by applying a frequency transform to a given block of pixels, c) excluding from the watermarking map, for the current compressed image, the blocks associated with the zone of interest, as well as those whose coefficients $C_1$ and $C_2$ defined by the watermarking map do not satisfy the following criterion:

abs(abs($C_1$)−abs($C_2$))<S where S is a predetermined threshold and abs( ) the function returning the absolute value of an integer.

d) applying a digital watermarking function to each available block obtained in step c) so as to obtain a watermarked compressed stream by way of a binary sequence in the following manner:

---

To insert a "1" bit of said binary sequence,
  If abs($C_1$) > abs($C_2$), nothing is changed
  If abs($C_1$) ≤ abs($C_2$), then $\epsilon$ = abs($C_2$) − abs($C_1$) is calculated and the value of $C_1$ is modified by:
    $C_1 = C_1 + \epsilon + 1$ if $C_1$ is positive
    $C_1 = C_1 - \epsilon - 1$ if $C_1$ is negative
To insert a "0" bit of said binary sequence,
  If abs($C_1$) < abs($C_2$), nothing is changed
  If abs($C_1$) ≥ abs($C_2$), $\epsilon$ = abs($C_1$) − abs($C_2$) is calculated and the value of $C_2$ is modified by:
    $C_2 = C_2 + \epsilon + 1$ if $C_2$ is positive
    $C_2 = C_2 - \epsilon - 1$ if $C_2$ is negative

---

According to one embodiment, the binary sequence to be embedded is a digest of the image, obtained via the following step:

Concatenating the coefficients arising from the frequency transform of the blocks belonging to said objects or groups of objects obtained defining a zone of interest and applying to the result a visual hash function generating as output a digest of the image.

According to one embodiment, the digest of the image is ciphered via an ciphering function.

According to one embodiment, the watermarked compressed stream is processed so as to verify the integrity of the video sequence according to the following steps:

analyzing the watermarked compressed stream in the compressed domain so as to define for a given compressed image at least one first type of objects or group of objects to be processed defining a zone of interest, concatenating the coefficients arising from the frequency transform of the blocks belonging to said objects or groups of objects obtained defining a zone of interest and applying to the result a visual hash function generating as output a digest of the image, recovering the watermarked digest in the watermarked compressed stream on the basis of the watermarking map performing a comparison of said watermarked digest with the digest.

According to one embodiment, the watermarked compressed stream is processed so as to verify the integrity of the video sequence according to the following steps:

analyzing the watermarked compressed stream in the compressed domain so as to define for a given compressed image at least one first type of objects or group of objects to be processed defining a zone of interest, concatenating the coefficients arising from the frequency transform of the blocks belonging to said objects or groups of objects obtained defining a zone of interest and applying to the result a visual hash function generating as output a digest of the image, applying an ciphering function to the digest previously obtained so as to obtain an ciphered digest, recovering the watermarked digest in the watermarked compressed stream on the basis of the watermarking map, performing a comparison of said watermarked digest with the ciphered digest.

According to one embodiment, the ciphering function implements an asymmetric encryption algorithm or an AES (Advanced Encryption Standard) encryption algorithm.

According to one embodiment, the visual hash function implements the SHA-1 algorithm and that the ciphered digest has a size of 160 bits.

According to one embodiment, the binary sequence to be embedded is a message comprising an indication about the characteristics of the zones of interest and is provided by the step of analysis in the compressed domain.

According to one embodiment, the video sequence is produced by an MPEG standard or an ITU standard.

The subject of the invention is also a device for digitally watermarking at least one part of a video stream or of a compressed video sequence comprising a sender and a receiver, characterized in that:

said sender comprises at least the following elements: a module for analysis in the compressed domain, a visual hash module, a digital watermarking module and a transmission module for the watermarked stream, said receiver comprises at least the following elements: a transmission module, an analysis module, a visual hash module, an integrity validation module.

BRIEF DESCRIPTION OF THE DRAWINGS

Other characteristics and advantages of the method and of the device according to the invention will be more apparent on reading the description which follows of an exemplary embodiment given by way of wholly nonlimiting illustration together with the figures which represent.

DETAILED DESCRIPTION

In order to better elucidate the manner of operation of the method according to the invention, the description comprises a reminder regarding the way to perform an analysis in the compressed domain, such as is described for example, in patent application US2006/188013 with reference to FIGS. 1, 2, 3 and 4 and also in the following two references:

Leny, Nicholson, Prêteux, "De l'estimation de mouvement pour l'analyse temps réel de vidéos dans le domaine compressé" [Motion estimation for the real-time analysis of videos in the compressed domain], GRETSI, 2007;

Leny, Prêteux, Nicholson, "Statistical motion vector analysis for object tracking in compressed video streams", SPIE Electronic Imaging, San Jose, 2008.

Hereinafter in the text the term "block" refers to a set of pixels of an image which together form a matrix and the term "transformed block" identifies the result obtained via a transform function allowing passage to the frequency domain, applied to said block. For example, a block of 8×8 pixels represented by a matrix will be transformed into a matrix with 8 rows and 8 columns containing 64 coefficients $C_i$.

In short, certain techniques used in the MPEG standards and set forth in these articles consist in dividing the video compression into two steps. The first step is aimed at compressing a still image. The image is firstly divided into blocks of pixels (from 4×4 to 16×16 according to the MPEG-1/2/4 standards), which undergo, subsequently, a transform allowing passage to the frequency domain, such as the discrete cosine transform (DCT) or the integer transform, and then a quantization makes it possible to approximate or to delete the high frequencies to which the eye is less sensitive. Finally the quantized data are entropically coded. For this purpose, the quantization makes it possible to delete or attenuate the high frequencies that are less sensitive to the eye and thus to reduce the amount of information. The objective of the second step is notably to reduce the temporal redundancy. It makes it possible to predict an image on the basis of one or more other image(s) previously decoded within the same sequence (motion prediction). For this purpose, the process searches through these reference images for the block which best corresponds to the desired prediction. Only a vector (Motion Estimation Vector, also known as the Motion Vector), corresponding to the displacement of the block between the two images as well as a residual error making it possible to refine the visual rendition are preserved.

Figure 1:
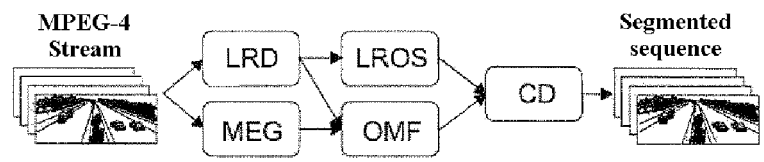
FIGS. 1 to 4, the results obtained by an analysis in the compressed domain, FIG. 5, an exemplary watermarking method according to the invention applied to a video stream undergoing compression, FIG. 6, an exemplary integrity verification method in respect of a watermarked compressed stream via the method according to the invention, FIG. 7, an exemplary diagram for a video sender suitable for implementing the watermarking method according to the invention, and FIG. 8, an exemplary diagram for a video receiver suitable for implementing the watermarking method according to the invention and allowing the verification of the integrity of the video sequence.

These vectors do not, however, necessarily correspond to a real motion of an object in the video sequence but may be likened to noise. Various steps are therefore necessary to use this information to identify the moving objects. The work described in the aforementioned publication by Leny et al, "De l'estimation de mouvement pour l'analyse temps réel de vidéos dans le domaine compressé" [Motion estimation for the real-time analysis of videos in the compressed domain], and in the aforementioned patent application US02006/18 8013 have made it possible to delimit five functions rendering the analysis in the compressed domain possible, these functions and the modules implementing them are represented in FIG. 1:

1) a low resolution decoder (LRD—Low-Res Decoder) makes it possible to reconstruct a sequence in its entirety at the resolution of the block, deleting on this scale the motion prediction;
2) a generator of motion estimation vectors (MEG—Motion Estimation Generator) determines, for its part, vectors for the set of blocks that the coder has coded in "Intra" mode (within Intra or predicted images);
3) a module for low resolution segmentation of objects (LROS—Low-Res Object Segmentation) which relies, for its part, on an estimation of the background in the compressed domain by virtue of the sequences reconstructed by the LRD and therefore gives a first estimation of the moving objects;
4) a motion-based objects filter (OMF—Object Motion Filtering) which uses the vectors output by the MEG to determine the moving zones on the basis of the motion estimation;
5) finally a module making it possible to establish a cooperative decision (CD—Cooperative Decision) on the basis of these two segmentations which takes into account the specificities of each module according to the type of image analyzed (Intra or predicted).

The main benefit of the analysis in the compressed domain pertains to the calculation times and the memory requirements which are considerably reduced with respect to the conventional analysis tools. Based on the work performed during the video compression, the analysis times are currently from 10 to 20 times the real time (250 to 500 images processed per second) for 720×576 4:2:0 images.

One of the drawbacks of the analysis in the compressed domain, such as described in the aforementioned documents, is that the work is performed on the equivalent of low resolution images by manipulating blocks composed of groups of pixels. It follows from this that the image is analyzed with less precision than by implementing the usual algorithms used in the uncompressed domain. Moreover, objects that are too small with respect to the partition into blocks may pass unnoticed.

Figure 2:
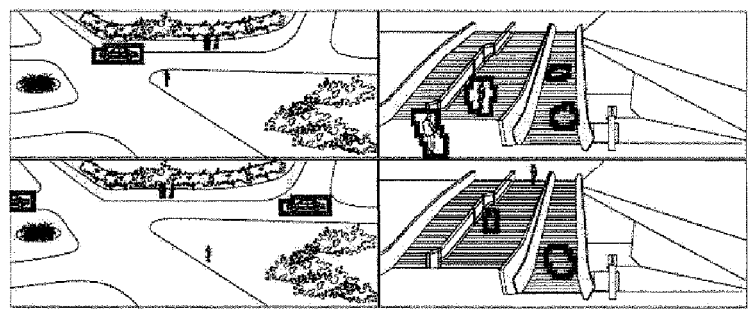
Figure 3:
Figure 4:
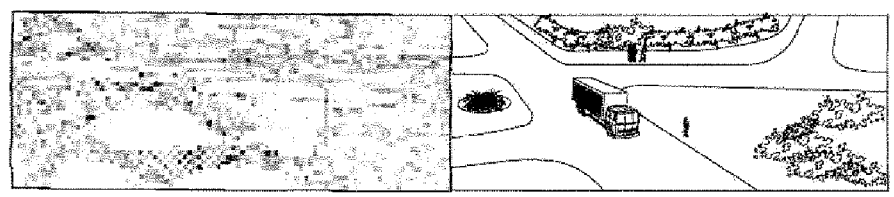

The results obtained by the analysis in the compressed domain are illustrated by FIG. 2 which show the identification of zones containing moving objects. FIG. 3 shows diagrammatically the extraction of specific data such as the motion estimation vectors represented on the left of FIG. 3 and FIG. 4 low resolution confidence maps obtained corresponding to the contours of the image, and also represented on the left of the figure.

Figure 5:
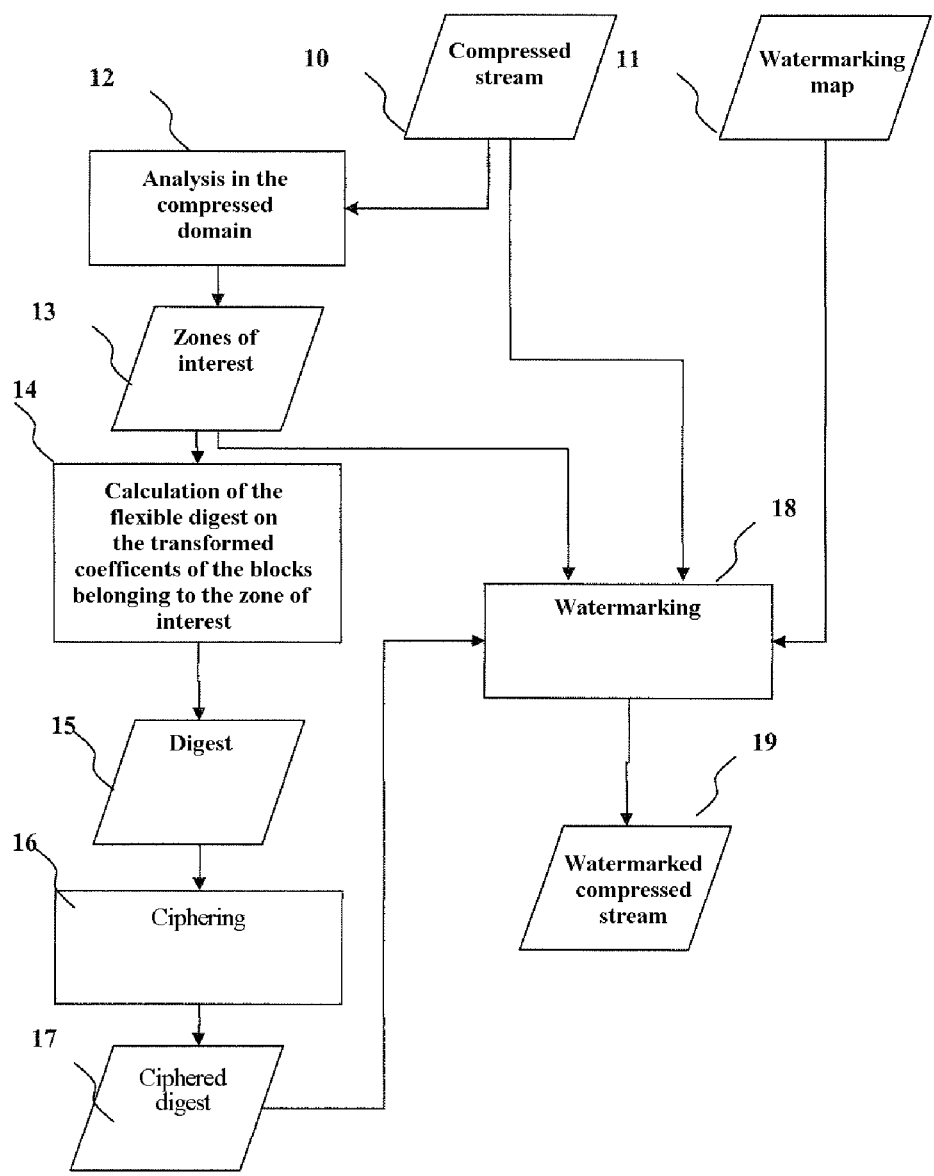

FIG. 5 shows diagrammatically an exemplary embodiment of the method according to the invention in which a digest of the zones of interest of an image is calculated for example via a flexible signature function, better known to the person skilled in the art by the term "visual hash". This digest is thereafter embedded in the compressed video stream to be transmitted.

The compressed video stream 10 is transmitted to a first step, known to the person skilled in the art, of analysis 12 in the compressed domain, the function of which is to extract the zones of interest defined by the user according to pre-established criteria. Thus, the method employs for example, a sequence of masks comprising blobs (regions that have received an identical label) related to the moving objects. The masks may be binary masks.

This analysis in the compressed domain has made it possible to define for each image or for a defined group of images GoP (Group of Pictures), on the one hand various zones $Z1i$ belonging to a foreground P1 and other zones $Z2i$ belonging to a background P2 of one of the images of the video sequence. The analysis may be performed by implementing the method described in the aforementioned patent application US2006/188013. However, any method making it possible to obtain an output of the analysis step taking the form of image-based masks, or any other format or parameters associated with the analyzed compressed video sequence will also be able to be implemented at the output of the step of analysis in the compressed domain. On completion of the analysis step, the method has made it possible to isolate the zones of interest, 13, $Z1i$ the integrity of whose content it is desired to protect. In another embodiment, the zones of interest Z1$i$ may on the contrary be fixed objects whose content, for example signposts, it is sought to identify unambiguously. In a case of general application, the method according to the invention applies to any type of zone of interest that the analysis step 12 has made it possible to isolate.

In order to allow reliable authentication of the zones of interest within an image, it is necessary to generate a signature which is directly related to the content of said zones. For this purpose, the method uses for example a technique known to the person skilled in the art by the name "visual hash" function. A method making it possible to calculate a digest of an image (or of any type of multimedia data) is called a visual hash function. In contradistinction to cryptographic hash functions, such a function makes it possible to generate an identical digest for two different images, with the proviso that they are sufficiently close from the perceptual point of view. The digest resulting from this operation is also called a flexible signature, the qualifier "flexible" being employed as opposed to the qualifier "strict". On the other hand, the digest must be different as soon as the image undergoes an alteration of its semantics, for example the addition of a personage or of an object into a scene, the modification of images or of text. Therefore, the issue of formally defining the semantics of an image renders the design of visual hash functions tricky.

Nonetheless, it is possible to define a locality criterion, which may be considered to be valid in the great majority of cases. A contingent alteration, that is to say one due to compression of the video stream for example, will give rise to modifications of the signal of low amplitude, but distributed in a relatively uniform manner over the whole of the image. On the other hand, an alteration of the semantics will result in a strong but localized modification of the data. It will therefore be sought to use threshold-based hash functions, which tolerate modifications below a certain value but react to overly strong localized variations.

This functionality is implemented during step 14. The method selects the discrete cosine transform blocks (DCT blocks) belonging to the zones of interest within the compressed video stream and concatenates them to obtain a message. This message is provided as input to a visual hash algorithm, 14, which makes it possible to calculate a digest 15 of the part of the image consisting of said zones of interest. In the case of use of the method coupled with the H.264 video compression standard, the blocks to be considered for obtaining the message are integer-transform blocks. Generally, any equivalent transform which could be defined in any future or earlier video compression standards remains compatible with the method according to the invention. The visual hash algorithm used may be, for example, an algorithm of SHA-1 type such as described by the document referenced "FIPS PUB 180-3, Secure Hash Standard." In this case, the input message for said algorithm must have a length of $2^{64}$ bits, said message is optionally supplemented to reach the required length. This eventuality is provided for in the SHA-1 standard which therefore remains compatible in this case. The digest 15 has a length of 160 bits in this embodiment. Any other algorithm allowing the calculation of a digest of an image may be used.

Step 16 of the method thereafter implements a function for ciphering or encrypting the digest 15 obtained via the previous step 14. The encryption algorithm used may be, for example, an asymmetric encryption algorithm or an AES (Advanced Encryption Standard) algorithm. A ciphered digest 17 is obtained after this step. Once this result has been obtained, the rest of the method consists in embedding said ciphered digest 17 in the zones of lesser importance of the image by way of a digital watermarking step 18.

Beforehand, a watermarking map 11 is defined before beginning the processing of the sequence, doing so without knowing, a priori, the compressed video stream 10. This map determines all the blocks of the image which can contain the item of information to be embedded. It may happen that blocks associated with the zones of interest Z1$i$ determined on completion of the step of analysis in the compressed domain 12 belong to this watermarking map, their position not being known beforehand. As it is not desirable to alter the visual rendition of said zones, even in a very imperceptible manner, it will be sufficient to verify before the watermarking of each block whether it belongs to a zone of interest: if such is the case, the watermarking process passes automatically to the next block, otherwise the current block is eligible to embed the portion of the current digest. In an embodiment implementing a video compression using the discrete cosine transform (DCT), each block corresponds to 8×8 pixels. For a standard resolution of 720×576 pixels, there are therefore 90×72 blocks for an image, i.e. 6480 potential blocks from which it is appropriate to remove the blocks belonging to the zones of interest Z1$i$. In the exemplary implementation of step 16, the ciphered digest 17 has a length of 160 bits, it is appropriate in this case to select 160 blocks from among those available to make it possible to embed the entirety of the ciphered digest in the compressed stream 10.

With the watermarking map 11 being generated at the beginning of the method, at this juncture it is not possible to ascertain the exact number of blocks available for the watermarking since the analysis step 12 making it possible to determine the zones of interest 13 and therefore the number of associated blocks has not yet been performed. During the generation of the watermarking map, it is therefore not possible to know whether a sufficient number of blocks exists to cover the total length of the ciphered digest 17, in our example 160 bits. To solve this problem, a solution consists in arbitrarily determining a maximum number of blocks to be selected, to perform the watermarking of these blocks as long as they do not form part of the zones of interest and as long as the end of the image is not reached. If at the end of this process, the 160 bits have not all been used, the operation is nevertheless stopped. The watermarked ciphered digest within the compressed stream 10 will, in this case, have a smaller length than that calculated during step 16.

Step 18 of digital watermarking allowing the embedding of the ciphered digest 17 in the compressed stream 10, on the basis of the knowledge of the zones of interest 13 of an image and of the watermarking map 11 can, for example, be carried out in the manner described in French patent application 2896938.

On establishing the watermarking map, once the blocks have been selected, for each of them, two transformed coefficients $C_1$ and $C_2$ are randomly drawn. Said coefficients are tested in the following manner: if abs(abs($C_1$)–abs($C_2$)), where the notation abs( ) corresponds to the function returning the absolute value of a number, is less than a predetermined threshold, the watermarking can take place on the corresponding block since the visual rendition will be imperceptible. In the converse case, we pass to the next block.

The order relation between abs($C_1$) and abs($C_2$) is then tested and these two coefficients are modified if required so that they reflect the value of the bit of the ciphered digest 17 to be embedded "0" or "1". The following algorithm is implemented:

To insert a "1" bit,
 If $\text{abs}(C_1) > \text{abs}(C_2)$, nothing is changed
 If $\text{abs}(C_1) \leq \text{abs}(C_2)$, then $\epsilon = \text{abs}(C_2) - \text{abs}(C_1)$ is calculated and the value of $C_1$ is modified, $C_1 = C_1 + \epsilon + 1$ if $C_1 > 0$, $C_1 = C_1 - \epsilon - 1$ otherwise.
To insert a "0" bit,
 If $\text{abs}(C_1) < \text{abs}(C_2)$, nothing is changed
 If $\text{abs}(C_1) \geq \text{abs}(C_2)$, then $\epsilon = \text{abs}(C_1) - \text{abs}(C_2)$ is calculated and the value of $C_2$ is modified, $C_2 = C_2 + \epsilon + 1$ if $C_2 > 0$, $C_2 = C_2 - \epsilon - 1$ otherwise.

In a variant embodiment, the watermarked item of information within the compressed stream can consist of another item of data such as, for example, an alarm triggered subsequent to an activity analysis operation performed on the video sequence instead of the digest allowing integrity verification. The analysis in the compressed domain can indeed culminate in the generation of messages of higher level such as, for example, the presence of a moving vehicle in a given zone or an item of information about the characteristics of an object such as its color or its size or else quite simply an alarm indicating that an object of a specified size has been detected in a zone of the image. These messages can also be embedded in the sequence via the embedding method according to the invention. The analysis step 12 makes it possible in this case to produce a relevant item of information that can be utilized directly by the watermarking step 18.

Figure 6:
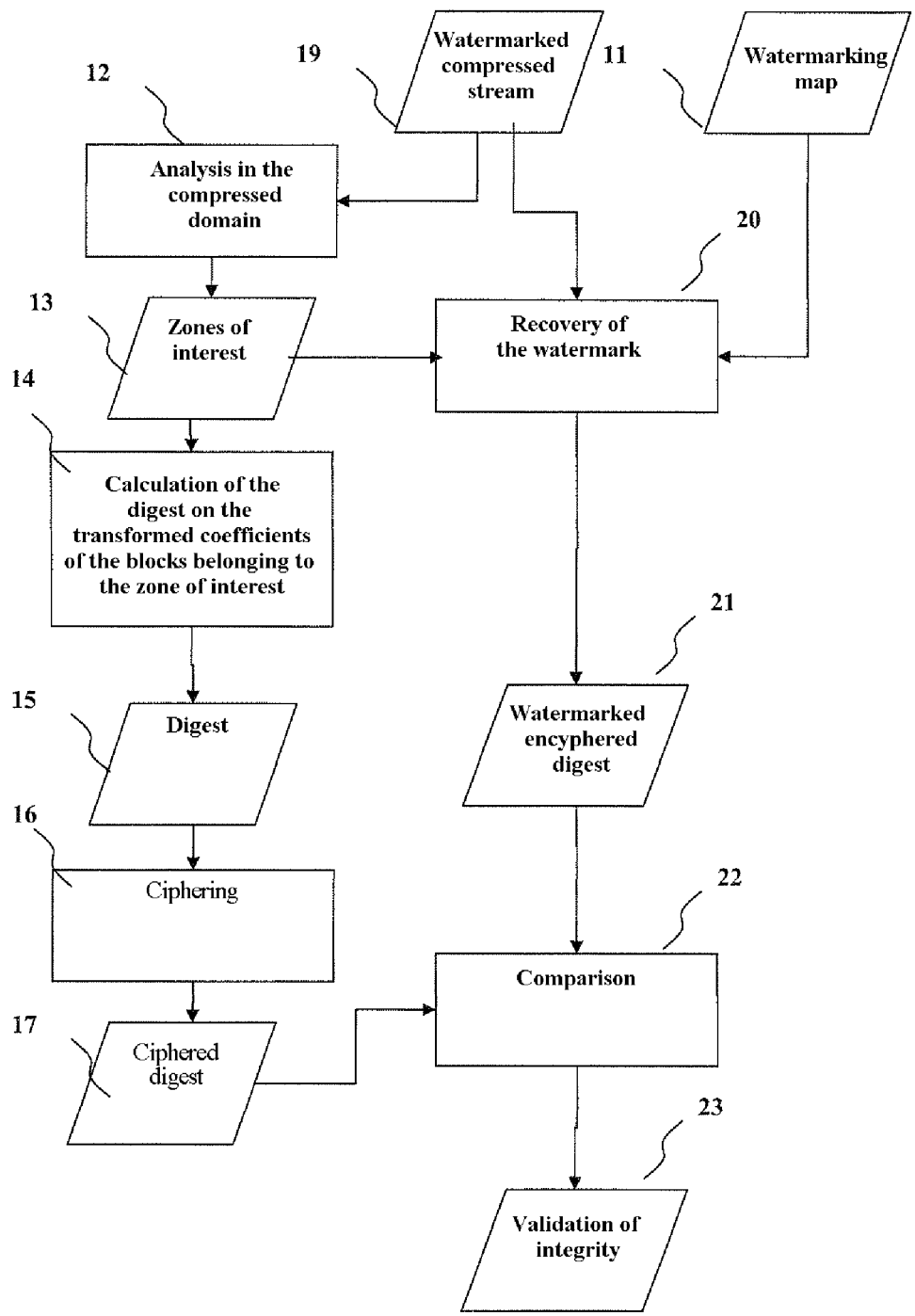

FIG. 6 illustrates a variant embodiment in which the watermarked compressed stream 19 obtained via the previously described method according to the invention is used to verify the integrity of the zones of interest of the transmitted video sequence. The watermarked compressed stream 19 is subjected to the same steps 12, 14 and 16 as previously so as to obtain a ciphered digest 17 identical to that described in FIG. 5. In parallel a step 20 makes it possible to recover the watermarked ciphered digest 21 embedded within the watermarked compressed stream 19. This step is carried out by using the watermarking map 11 described previously. A comparison 22 of the two digests 17 and 21 makes it possible to obtain an item of information regarding validation of the integrity of the zones of interest of the sequence 23. This comparison is made on the length of the watermarked ciphered digest 21 which may be shorter than that 17 generated via the hash step 14 and ciphering step 16, as explained previously. In this case, the comparison is made solely on the common part of the two digests 21 and 17, validating the integrity only in part. A minor alarm specifying that the image considered is only partially validated may be returned, in this case, to the end user.

Figure 7:
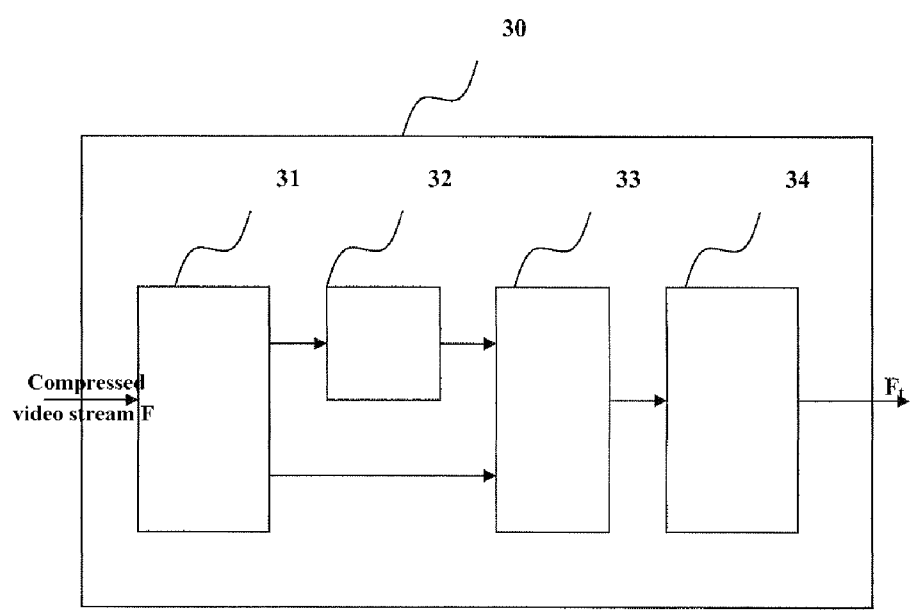

FIG. 7 represents a block diagram of a device according to the invention representing a video sender 30 adapted for implementing the steps described with FIG. 5. The video sender 30 comprises a video analysis module 31 receiving the compressed video stream F and suitable for determining the various zones of interest $Z1i$, a module 32 carrying out a hash function followed by ciphering of the transformed coefficients of the zones $Z1i$ and providing at its output a ciphered digest of the image, a digital watermarking module 33 suitable for inserting said digest within the compressed stream without altering the visual rendition of the video sequence and finally a communication module 34 allowing the device to transmit at one and the same time the watermarked compressed video stream $F_t$ and a watermarking map generated at the start of the process by the module 33.

Figure 8:
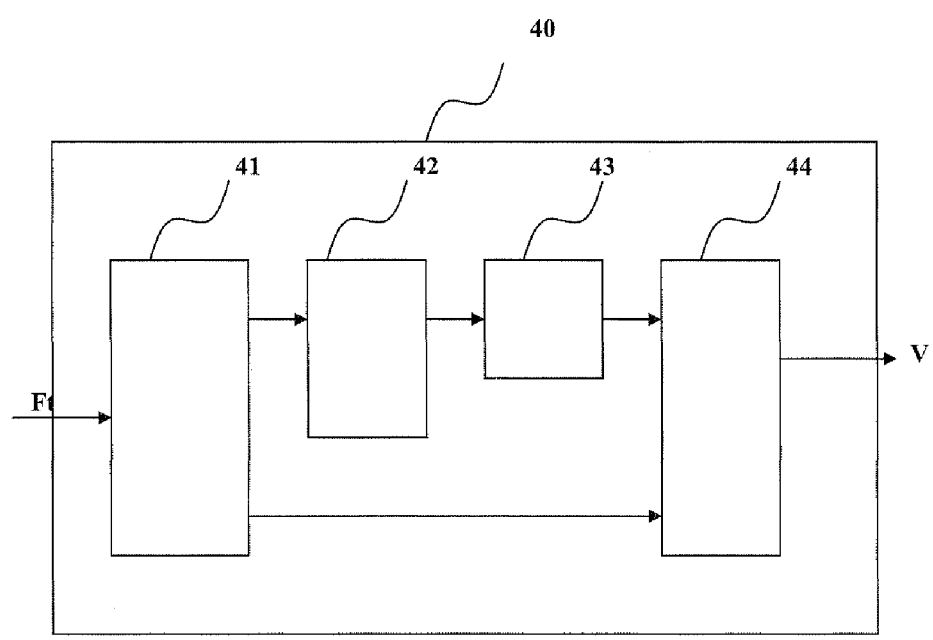

FIG. 8 represents a block diagram of a device according to the invention representing a video receiver 40 adapted for implementing the steps described in FIG. 6. The video receiver 40 comprises a reception module 41 allowing the device to receive at one and the same time a watermarked compressed video stream $F_t$ and an associated watermarking map, both generated by the method according to the invention, described by FIG. 5. The video receiver also comprises a module 42 which performs an analysis in the compressed domain of the stream $F_t$ and makes it possible to identify the various zones of interest $Z1i$, a module 43 carrying out a hash function followed by ciphering of the transformed coefficients of the zones $Z1i$ and providing at its output a ciphered digest of the image, a module 44 carrying out the recovery in the stream $F_t$ of a watermarked ciphered digest and the comparison with the ciphered digest delivered by the module 43. The module 44 produces as output an integrity validation decision V in respect of the zones of interest of the sequence.

The method and the system according to the invention exhibit several advantages notably of guaranteeing that certain zones of interest of the image have not been modified. By using the analysis in the compressed domain, it is made possible to perform all the processing operations without decompressing the video stream. The hardware resources are therefore reduced in comparison with the prior art schemes and allow the use of inbuilt systems. The ciphered digest, or signature, obtained via the method according to the invention makes it possible to target solely the zones of interest and its embedding by watermarking on the remainder of the image allows independent verification of each image while safeguarding said zones of interest from any modification. Another advantage resides in the ability to embed within the compressed video stream messages providing information about the characteristics of an object present in the video sequence, for example its size, its color, or even its presence. The information embedded in the compressed video stream via the method according to the invention may be independent from one image to another. The characteristics of a given image within the video stream may be taken into account to determine the type of information to be embedded. For example, a signature allowing verification of the integrity of the content will preferably be embedded in a still image encoded in its entirety, termed an "intra" image, rather than in one image predicted on the basis of another.

The invention claimed is:

1. A method for embedding a binary sequence in a video sequence or a compressed video stream, said stream being able to be decomposed into several types of objects, the method being applied to at least one image contained in said video sequence and the method comprising:
   a) analyzing the video sequence in the compressed domain so as to define for a given compressed image at least one first type of objects or group of objects to be processed defining a zone of interest,
   b) generating a watermarking map defining the set of the blocks of pixels of the binary sequence that are eligible for the embedding operation, as well as two coefficients $C_1$ and $C_2$ arising from a frequency transform for each of said blocks, said coefficients $C_1$ and $C_2$ being drawn randomly from among the set of coefficients obtained by applying a frequency transform to a given block of pixels,
   c) excluding from the watermarking map, for the current compressed image, the blocks associated with the zone of interest, as well as those whose coefficients $C_1$ and $C_2$ defined by the watermarking map do not satisfy the following criterion:

abs(abs($C_1$)–abs($C_2$))<S where S is a predetermined threshold and abs( ) the function returning the absolute value of an integer, and d) applying a digital watermarking function to each available block obtained in step c) so as to obtain a watermarked compressed stream by way of a binary sequence in the following manner:

--- to insert a "1" bit of said binary sequence,
   if abs($C_1$) > abs($C_2$), nothing is changed,
   if abs($C_1$) ≤ abs($C_2$), then $\epsilon$ = abs($C_2$) – abs($C_1$) is calculated and the value of $C_1$ is modified, $C_1 = C_1 + \epsilon + 1$ if $C_1 > 0$, $C_1 = C_1 - \epsilon - 1$;
to insert a "0" bit of said binary sequence,
   if abs($C_1$) < abs($C_2$), nothing is changed,
   if abs($C_1$) ≥ abs($C_2$), $\epsilon$ = abs($C_1$) – abs($C_2$) is calculated and the value of $C_2$ is modified, $C_2 = C_2 + \epsilon + 1$ if $C_2 > 0$, $C_2 = C_2 - \epsilon - 1$.

---

2. The method according to claim 1, wherein the binary sequence is a digest of the image, obtained via the following step:
   concatenating the coefficients arising from the frequency transform of the blocks belonging to said objects or groups of objects obtained defining a zone of interest and applying to the result a visual hash function generating as output a digest of the image.

3. The method according to claim 2, wherein the digest of the image is ciphered via a ciphering function.

4. The method according to claim 2, wherein the watermarked compressed stream is processed so as to verify the integrity of the video sequence by executing the following steps:
   analyzing the watermarked compressed stream in the compressed domain so as to define, for a given compressed image, at least one first type of objects or group of objects to be processed defining a zone of interest,
   concatenating the coefficients arising from the frequency transform of the blocks belonging to said objects or groups of objects obtained defining a zone of interest and applying to the result a visual hash function generating as output a digest of the image,
   recovering the watermarked digest in the watermarked compressed stream on the basis of the watermarking map,
   performing a comparison of said watermarked digest with the digest.

5. The method according to claim 3, wherein the watermarked compressed stream is processed so as to verify the integrity of the video sequence by executing the following steps:
   analyzing the watermarked compressed stream in the compressed domain so as to define, for a given compressed image, at least one first type of objects or group of objects to be processed defining a zone of interest,
   concatenating the coefficients arising from the frequency transform of the blocks belonging to said objects or groups of objects obtained defining a zone of interest and applying to the result a visual hash function generating as output a digest of the image,
   applying a ciphering function to the digest previously obtained so as to obtain a ciphered digest,
   recovering the watermarked digest in the watermarked compressed stream on the basis of the watermarking map,
   performing a comparison of said watermarked digest with the ciphered digest.

6. The method according to claim 3, wherein the ciphering function implements an asymmetric encryption algorithm or an AES (Advanced Encryption Standard) encryption algorithm.

7. The method according to claim 1, wherein the visual hash function implements the SHA-1 algorithm and that the ciphered digest has a size of 160 bits.

8. The method according to claim 1, wherein the binary sequence is a message, generated by the step of analysis in the compressed domain, comprising an indication about the characteristics of the zones of interest.

9. The method according to claim 1, wherein the video sequence is produced by an MPEG standard or an ITU standard.

10. A device for digitally watermarking at least one part of a video stream or of a compressed video sequence by performing the method according to claim 1, the device comprising:
   a sender comprising a module for analysis in the compressed domain, a visual hash module, a digital watermarking module and a transmission module for the watermarked stream, and
   a receiver comprising a transmission module, an analysis module, a visual hash module, and an integrity validation module.

\* \* \* \* \*